(12) United States Patent
Kumar et al.

(10) Patent No.: US 10,834,129 B2
(45) Date of Patent: Nov. 10, 2020

(54) METHOD AND APPARATUS FOR USER PROTECTION FROM EXTERNAL E-MAIL ATTACK

(71) Applicant: Prekari, Inc., Los Altos, CA (US)

(72) Inventors: Deepak Kumar, San Jose, CA (US); Anshu Sharma, Los Altos, CA (US)

(73) Assignee: Prekari, Inc., Los Altos, CA (US)

( * ) Notice: Subject to any disclaimer, the term of this patent is extended or adjusted under 35 U.S.C. 154(b) by 101 days.

(21) Appl. No.: 16/180,868

(22) Filed: Nov. 5, 2018

(65) Prior Publication Data

US 2020/0145458 A1    May 7, 2020

(51) Int. Cl.
*H04L 29/06* (2006.01)
*H04L 12/58* (2006.01)
*G06F 3/0483* (2013.01)
*G06F 3/0482* (2013.01)

(52) U.S. Cl.
CPC .......... *H04L 63/1483* (2013.01); *H04L 51/12* (2013.01); *G06F 3/0482* (2013.01); *G06F 3/0483* (2013.01)

(58) Field of Classification Search
CPC .... H04L 63/1483; H04L 51/12; G06F 3/0482
See application file for complete search history.

(56) References Cited

U.S. PATENT DOCUMENTS

2016/0057167 A1* 2/2016 Bach ..................... H04L 63/101
726/23

* cited by examiner

*Primary Examiner* — Malcolm Cribbs
*Assistant Examiner* — Angela R Holmes
(74) *Attorney, Agent, or Firm* — Loza & Loza, LLP; Gordon R. Lindeen, III

(57) ABSTRACT

A method and apparatus are described for user protection from external e-mail attack. Some embodiments pertain to receiving an e-mail, detecting a suspicious element in the e-mail, disabling the suspicious element of the e-mail, flagging the suspicious element of the e-mail, displaying the e-mail in an e-mail user interface with the disabled element and the flag, receiving a user command to enable the disabled element of the displayed e-mail, and enabling the disabled element.

20 Claims, 9 Drawing Sheets

FIG. 2

METHOD AND APPARATUS FOR USER PROTECTION FROM EXTERNAL E-MAIL ATTACK

FIELD

The present description relates to e-mail communications and, in particular, to protection from external attack that comes through responding to e-mails.

BACKGROUND

E-mail remains the primary channel for enterprise communications. E-mail provides great convenience in that anyone can directly access almost anyone else at very low cost with a simple, and usually descriptive, address. This convenience is also its greatest liability. Phishing has become the primary approach to stealing personal data and accessing enterprise databases. Most companies are harmed by at least one successful phishing attack at least once a year.

In a typical phishing attack, an attacker sends an e-mail that impersonates a trusted person or a trusted third party. The impersonation is intended to induce the target, under false pretenses, to do something that the target would not otherwise do, such as provide a password or install a program. Social engineering is a technique to glean information from personal or social accounts and from enterprise publicity and to use that information to tailor an enterprise phish attack. A spear-phishing attack might use names, dates, or other personal information gleaned from social networks or other sources. Because e-mail provides direct access to the target, an individualized enterprise spear-phish e-mail appears more authentic, more urgent, or more personal. This increases the likelihood that the attack will be effective.

As more people use both a personal e-mail address and an enterprise e-mail address, employees are inclined to access personal e-mail addresses hosted by various cloud or ISP (Internet Service Provider) services e.g. gmail, Hotmail, Comcast, or Yahoo! on a device that also has access to an enterprise or office network. Many personal e-mail services can be accessed on a web browser that is installed on an enterprise device. While professional e-mail addresses are often based on secured domains guided by enterprise information security policies, private e-mail can travel through a browser interface and bypass the enterprise security solutions. Therefore, the security system may be blind to phishing attacks coming from personal e-mail accounts.

One common type of phish e-mail induces the target to open a link to an attacker web page and enter personal information, such as a password, or credit card number that is then captured by the attacker. These phish e-mails impersonate an Internet or banking account. Another common attack induces the target to launch a program, such as ransomware, spyware, or viruses by clicking on a link, picture or other object in the e-mail. A variety of other types of e-mail attacks are also categorized as phish attacks.

There are two primary defenses to phishing attacks. The first is a firewall between external attackers and the enterprise that captures suspicious e-mails before they reach the target. These barriers are normally considered inconvenient and unreliable. Trusted e-mails can be blocked and phishing e-mails can be allowed through the barrier. The second defense is to train users to recognize and delete the phish e-mails before interacting with them. Unfortunately, phish attacks are an asymmetrical threat. The attacker can send hundreds or thousands of different e-mails to many users at very low cost. Only one successful phish is required for the attacker to gain access to an entire enterprise. If only one internal user is untrained, busy, distracted, or mistaken, then the phish succeeds.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

FIG. 2 is a diagram of the e-mail user interface in a second configuration to show the third e-mail after it is opened according to embodiments.

DETAILED DESCRIPTION

Figure 1:
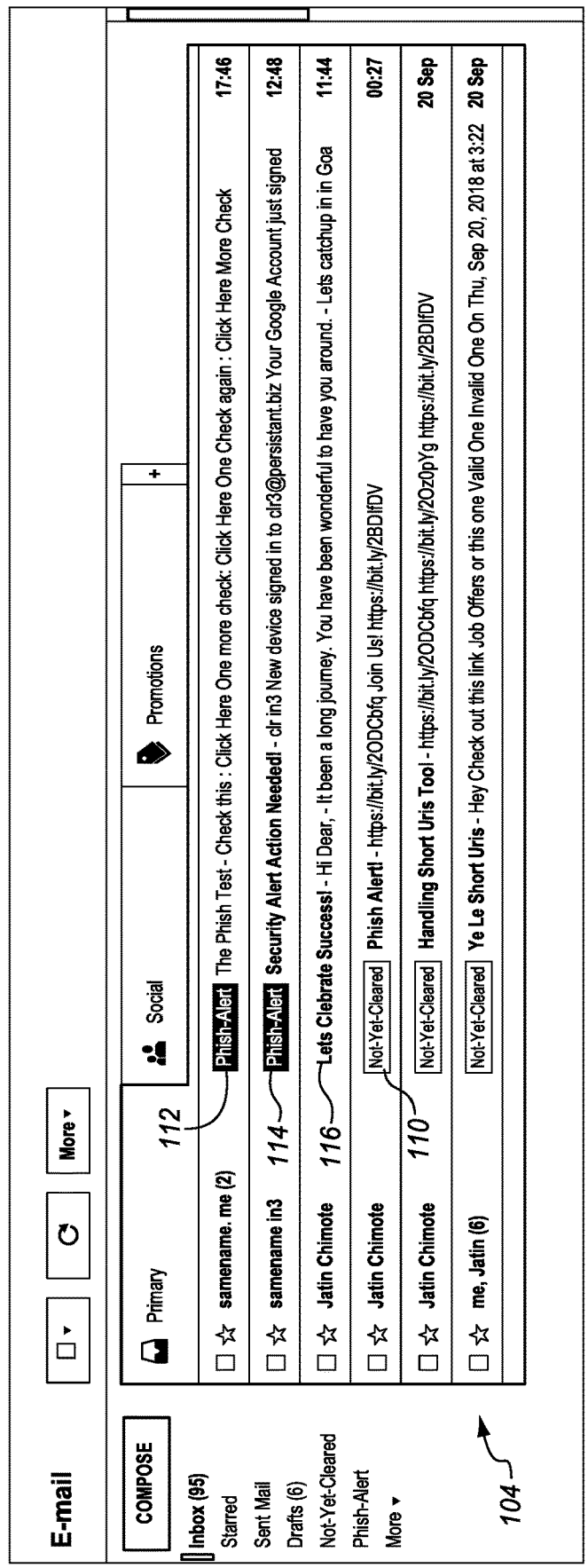
FIG. 1 is an e-mail user interface having a phish warning system in a first configuration according to embodiments.

A robust phish prevention system is described herein that can incorporate rich user engagement. A non-intrusive interface works with users in the moment and within the familiar e-mail interface in some embodiments. Suspicious e-mail can be clearly red-flagged and moved to a specific location of the e-mail interface to give a strong visual indicator of potential threats. The e-mails are locked up before users can engage with them even if by mistake. Users can hover over any links or images to see further insight into why something is marked as being unsafe. The insights are actionable in that users can engage with the insight or with the unsafe link or image notwithstanding the risk. These and other user actions control the properties of the e-mail and can also be used to provide information back to the automated system.

E-mail attacks can be frustrated by using user interaction. An automated system can be used to detect suspicious e-mails, then the reasons for the suspicion can be identified to the user so that the user is better able to make a decision. These identifications can be provided as actionable insights to allow the user to act either to reject the e-mail or to accept the risk. The user's selections provide feedback to the system.

As described herein, rather than quarantine a suspicious e-mail and block all access or functionality, a suspicious e-mail can be locked up and then flagged or labeled to identify why it is suspicious. The labels can point to specific parts of the e-mail such as addresses or links that are suspicious. The user can then review the labels and decide whether or not to trust the e-mail.

This approach avoids the inconvenience of a barrier or quarantine that places e-mails in an inaccessible location by presenting all e-mails in the Inbox. This approach also avoids a mistake caused by a busy or distracted user because the automated system generates labels or flags that demand the user's attention. In a normal workflow, a busy user can simply ignore the labeled e-mails until later. A distracted user will have the labels or flags to draw attention to the risks.

As further described herein, the functionality of a suspicious e-mail can be locked or disabled. This can be done using a document object model to show only the top level appearance, by generating an image of the e-mail or in a variety of other ways. The locked e-mail can then be rendered for the user with appropriate labels. When the user mistakenly attempts to reply, forward, save an image, or select a link, then the locked function will be prevented. The user can then be shown an appropriate flag indicating why the e-mail is suspicious or why such an action may be harmful. At the same time, the user can view the content of the e-mail without risk of taking any harmful actions.

Described embodiments allow users to take responsibility for their actions so that the user can indicate that a seemingly suspicious e-mail is trustworthy or that a seemingly suspicious action, such as selecting a link or opening a file is not harmful. This reduces user frustration and saves user time. By labeling or flagging e-mails with actionable insights, the automated system delivers training at the time that training is relevant using the suspicious e-mail as the training example.

FIG. 1 is a diagram of an e-mail user interface 102 having a phish warning system in a first configuration. This configuration shows an inbox 104 with a list of e-mails sorted according to recency 106. Any other sorting priority may be used depending on the selected preferences of the user. Each e-mail is listed with selected parts of the metadata and a portion of the text. In this example the selected metadata for display includes received time, sender, and subject. As shown, a fourth one of the e-mails is displayed with a first level phish warning flag 110 and a first and a second one of the e-mails is displayed with a second level phish warning flag 112. The first level is identified with a distinctive color, such as amber, and with an explanatory text, in this case "Not Yet Cleared," although any other suitable word or words may be used depending on the nature of the users and the user interface. The second level warning is displayed with a red flag and the word "Phish Alert."

In this example, the flag is a label as defined by Gmail®. The flag is shown as being on the left side of the subject column text. However, the flag may take any of a variety of different forms, depending on the e-mail provider and the e-mail clients. The flag may be in other locations or columns, depending on the particular e-mail user interface. In some implementations, stars, categories, folders and other devices may be used to flag an e-mail. In the present description, the term "flag" is used to refer to any of these or other visible markers that may be added to e-mail in any of a variety of different ways.

By displaying the phish warnings in the mailbox before the e-mail is used, the user is able to consider whether the e-mail should be opened or deleted before the user has had any interaction with the e-mail. Using such an early flag diminishes the risk of a successful phish attack. If the user is quickly checking for new e-mails, then the user may be inclined to skip the flagged e-mails. On the other hand, if the user is expecting an e-mail but does not see it, then the user may be inclined to go directly to the flagged e-mails. In any event the early warning promotes early caution. The third e-mail 116, in the mailbox, e.g. the inbox, does not have a flag and so has been cleared as safe. The user may desire to process these e-mails first.

The e-mail user interface may provide any of a variety of different tools for processing e-mails including sorting tools. The user may be able to sort the e-mails based on warning flags. The first level warning e-mails can be at the top, followed by the second level warnings, followed by the e-mails with no warning. This sorting allows the user to find the suspicious e-mails immediately and go directly to sorting them. Such a sorting system is beyond the sorting tools typically allowed by existing user interfaces and may require an additional column for the flags. Alternatively, an existing column, such as stars or folders may be used. In another embodiment a different tool such as a flag sorting buttons (not shown) may be used to allow sorting by flags without adding a separate flags column.

Figure 2:
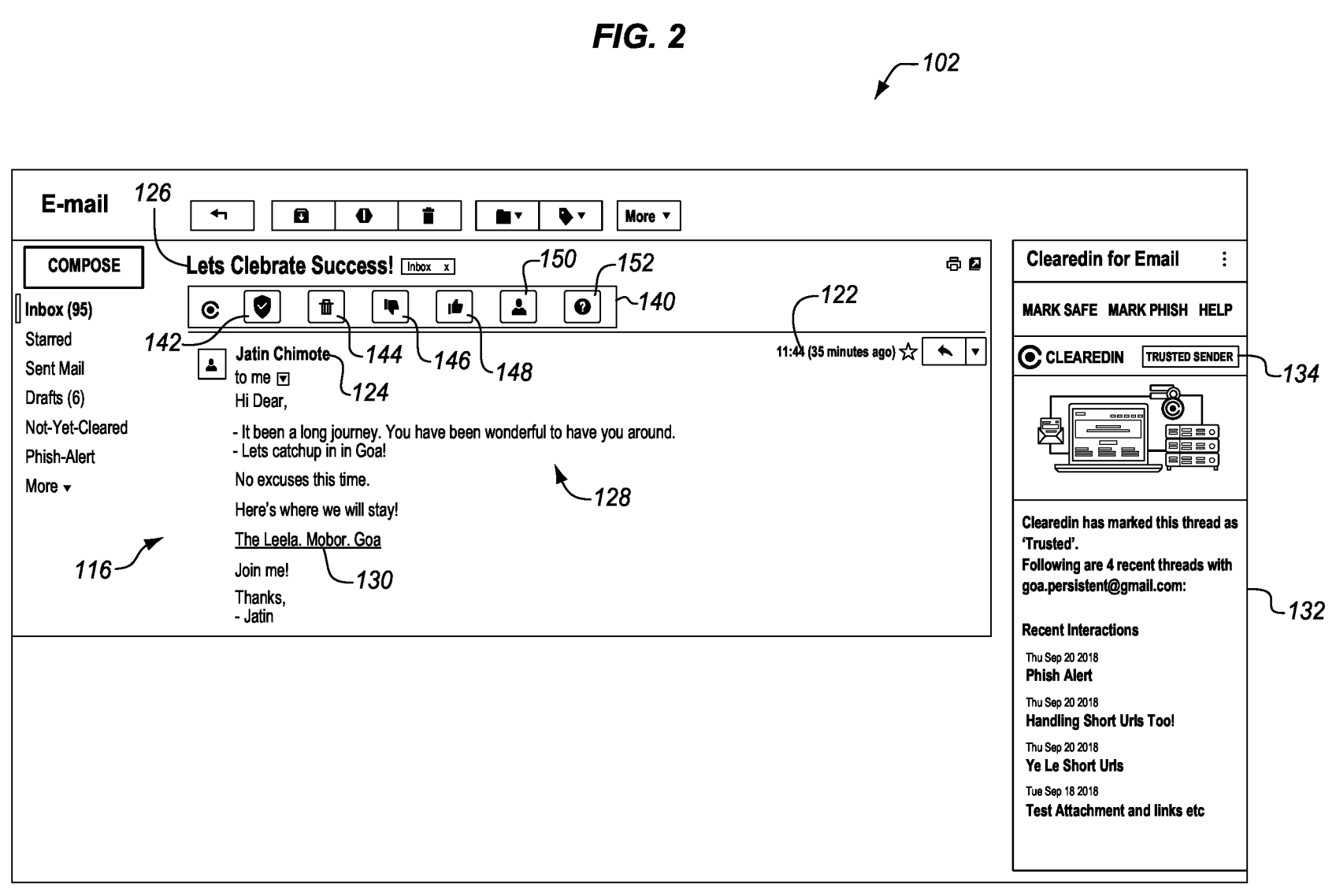

FIG. 2 is a diagram of the e-mail user interface 102 in a second configuration to show the third e-mail 116 after it is opened by the user. The opened e-mail 116 shows the normally displayed metadata, in this case the timestamp 122, sender 124, addressees (shown collapsed), and subject 126. In addition, the e-mail content 128 is shown. In this example the e-mail content includes text and a link 130. While the e-mail is not flagged in the mailbox display, it is flagged as "trusted sender" when it is opened. In an alternative configuration all e-mails are flagged including trusted ones in all mailboxes. A trusted e-mail may be flagged with a green "trusted" identifier or any other suitable indication. Using the opened e-mail display, the user is able to review the e-mail to determine if it contains any useful or important content and select any desired links. The links are all fully operational because this is not a suspicious e-mail.

In this particular e-mail user interface 102 example, there is also a special box 132 with information developed by the detection system. This information box does not contain any actionable insight but contains information about the e-mail, the trust status 134 of the e-mail and information about why it is trusted. In this example, the e-mail is trusted because the recipient has had multiple interactions with the sender and the recipient has indicated that the sender is trusted. Information is provided in the information box about these transactions. The information box may be hidden by selection of the user. The information box may be generated by a browser plug-in, an e-mail API (Application Programming Interface), by the e-mail server, or by another mechanism supported by the browser or e-mail client.

The opened e-mail includes a banner 140 with a general warning 142 about the risk level of the e-mail. The banner indicates that this e-mail is trusted, in this case with a green check mark. The banner warning helps to remind the user that the detection system is in operation and this e-mail is considered to be safe. In this example, the banner is placed between the subject and the sender of the e-mail. This helps to ensure that the user notices the banner. However, the banner may be placed in any of a variety of other location, such as between the sender and the body of the e-mail, within the body of the e-mail, or in a menu or command bar. The user is also able to perform actions within the banner based on the insight provided by the banner. These actions are each indicated with a corresponding button on the user interface. The actions include deleting, by selecting a delete button 144, disapproving by selecting a dislike button 146, approving by selecting a like button 148, requesting more information about why the e-mail is suspicious by selecting a question or help button 152, and reporting the e-mail by selecting a report button 150. The banner with the general warning and supporting general actions allows a user to quickly respond to a safe e-mail or indicate that a trusted e-mail should not be trusted. More or fewer actions may be provided within the banner, depending on the implementation. In addition, the warning may be placed in a different position from the action buttons. Many e-mail user interfaces allow buttons to be added in a ribbon, a menu, or a tab. Some of the action buttons may be moved to this location. The banner may also be generated by a browser plug-in or any of the other mechanisms mentioned above.

Figure 3:
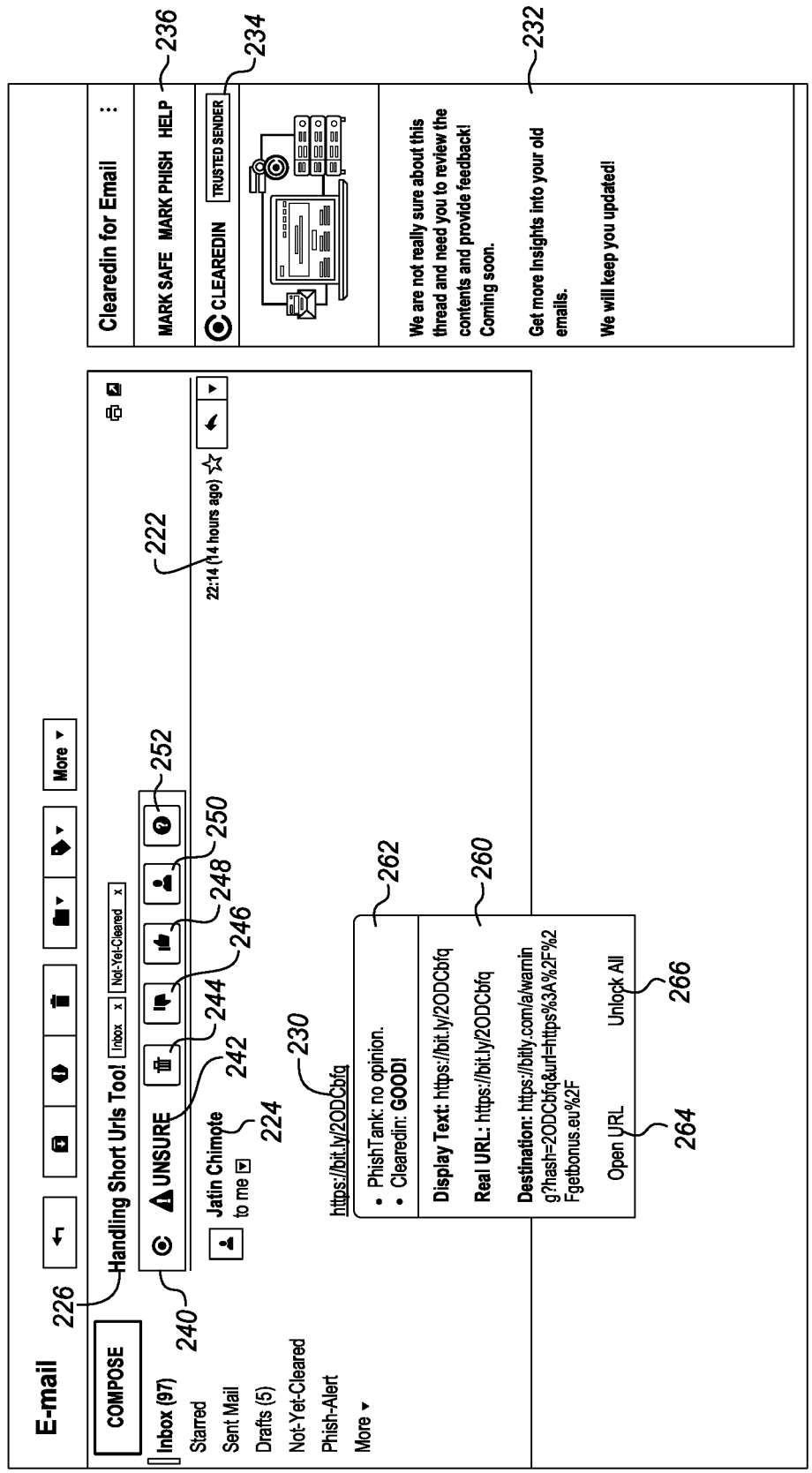
FIG. 3 is a diagram of the e-mail user interface in a third configuration to show the fourth e-mail of FIG. 1 after it is opened according to embodiments.

FIG. 3 is a diagram of the e-mail user interface 102 in a third configuration to show the fourth e-mail 110 of FIG. 1 after it is opened. The opened e-mail shows the normally displayed metadata, in this case the timestamp 222, sender 224, addressees (collapsed), and subject 226. In addition the e-mail content is shown. In this example the e-mail content includes text (obscured in this diagram) and a link 230.

The opened e-mail also includes a banner 240 similar to the banner in FIG. 2 with a general warning 242 about the risk level of the e-mail. The banner indicates that this e-mail is "unsure." This may be indicated with a yellow or amber color. The banner warning helps to remind the user that the detection system is in operation and that this e-mail presents a new situation and that caution should be used. The user is able to perform actions within the banner based on the insight provided by the banner. As in FIG. 2, these actions are each indicated with a corresponding button on the user interface. The actions include deleting, by selecting a delete button 244, disapproving by selecting a dislike button 246, approving by selecting a like button 248, requesting more information about why the e-mail is suspicious by selecting a question or help button 252, and reporting the e-mail by selecting a report button 250. The banner with the general warning and supporting general actions allows a user to quickly respond to the unsure e-mail or indicate that it should or should not be trusted.

For this e-mail, there is also a displayed information box 232 which contains further information about why the e-mail is indicated as "unsure." The information box is an example of actionable insight, in which some insight is provided and the user is provided with actions to take 236 to respond to the insights. These actions are presented in the information box as marking the e-mail as "safe" or as "phish." A help button allows the user to obtain still more information.

When the recipient takes an action, marking the e-mail as safe or phish, the detection system receives this information. For example, this e-mail does not have any suspicious content but is from an unknown sender. This is explained in the information box 232. If the recipient has indicates that this sender is trusted and then another e-mail is received from the same sender, then the detection system can mark the second e-mail as trusted as in FIG. 2. The information box for this next e-mail can indicate that the recipient trusts the sender. As explained in more detail below, such an e-mail may be subjected to further tests so that it may be indicated as phish if it contains bad links, even if it is from a trusted sender.

The e-mail is flagged 242 in the banner 240 as it is in the mailbox display. Within the displayed content, any suspicious element would also be flagged. However, this e-mail does not have any suspicious elements. Nevertheless, because the sender is unknown, the e-mail functionality is locked down until the recipient unlocks it. When the user hovers over or clicks on the one link, a risk box 260 appears. This box includes an opinion section 262, that indicates whether the link is dangerous. In this example, there are two opinions from two different services. The first service, identified as "PhishTank," has no opinion. The second service, identified as "ClearedIn" has an opinion that the link is good. The services and the opinions are optional features. More or fewer or no services may be used. The detection system can generate opinions with or without other services.

The risk box also optionally provides the actual address to which the link refers. The displayed text, the real URL (Uniform Resource Locator), and the destination for that URL are all displayed. This allows the user to compare these three. The user may be able to determine that the destination is a known or trusted destination. The user can also see whether the displayed text matches the real URL. While some browsers offer this information for any links, many e-mail browsers do not. By putting the information in the risk box it is easy and convenient for the user to access it. Finally, the risk box includes a button 264 to open the URL corresponding to the displayed real URL. Another button 266 allows the user to unlock all of the e-mail content. In this e-mail with only one link and no graphics, the effect of "unlock all" will be to unlock the link. The user must then also open the link.

The risk box is another example of actionable insight. When the user hovers over the link or tries to click on the link, then the risk box provides insight about that link. The user can then take an action based on the insight. In this case, there are three possible actions, open all, unlock all, and stop hovering. These choices can be sent to the detection system as an indication that the user considers the links to be safe and perhaps that the e-mail itself is trusted by the user. While the actions are described in the context of mouse movements, such a hovering and clicking, these are provided only as examples. Other mouse selection actions may be used instead. Any of the user actions described herein may alternatively be any of a variety of different touchscreen, gesture, voice or other actions to interact with displayed objects.

The actions taken by the detection system as shown in the e-mail interface go further than a typical firewall based phish protection system. While not visible in the diagram, the suspicious links in the e-mail have been disabled by the detection system, pending action by the user. The displayed e-mail may be an image of the e-mail or it may have specifically disabled elements using a document object model (DOM) or another software technique. As an example, a browser extension may be configured to disarm any one or more of the elements in the e-mail. In the case of an image, the image is configured based on the browser or e-mail client so that the image is rendered in line, as shown. It appears and displays just as the original e-mail would appear. In this way, if the user approves the e-mail or the link, then the e-mail is enabled. The suspicious links may be selected and the e-mail may be replied to, or forwarded. As another example, if the user disapproves the e-mail, the e-mail is not deleted. However, there is another button for deleting the e-mail. It may be useful to keep suspicious e-mails for reference purposes or other purposes. When the suspicious elements of the e-mail are disabled, then the suspicious e-mail may be preserved with a higher level of safety.

Figure 4:
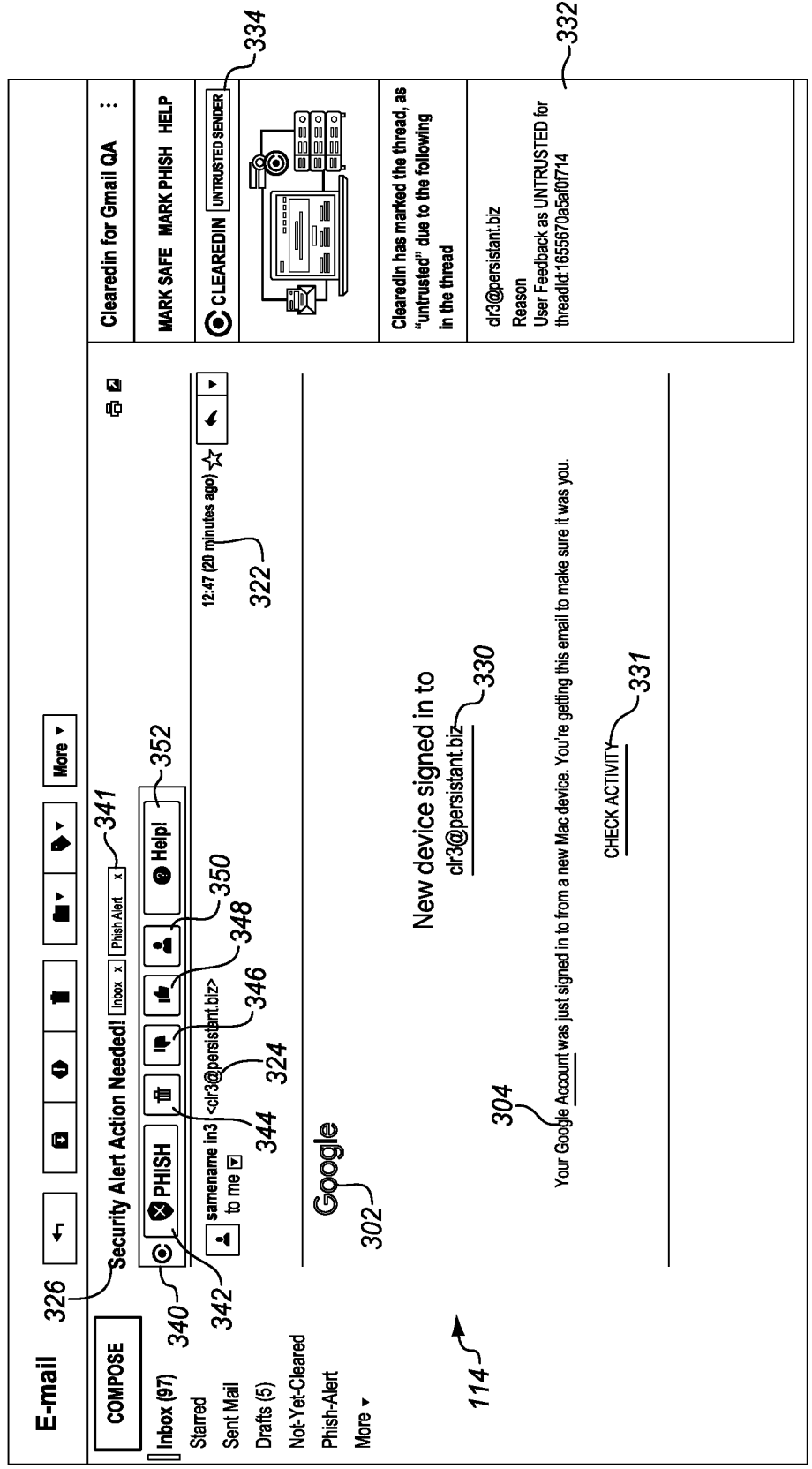
FIG. 4 is a diagram of the e-mail user interface in a fourth configuration to show the second e-mail in the inbox of FIG. 1 after it is opened according to embodiments.

FIG. 4 is a diagram of the e-mail user interface 102 in a fourth configuration to show the second e-mail 114 in the inbox of FIG. 1 after it is opened. As in the previous two examples, the opened e-mail shows the normally displayed metadata, in this case the timestamp 322, sender 324, and subject 326. The e-mail is also flagged as phish with a colored flag 341 similar to the flag shown in the inbox of FIG. 1. In addition the e-mail content is shown. As mentioned above, the particular position and relative sizes of these elements may be modified for different appearance effects or to emphasize different aspects to the user. With some e-mail clients the user may have an option to resize or reposition certain elements or event to remove or add some of the elements. The illustrated configuration and appearance is provided only as an example.

In this example the e-mail content includes graphics 302 and text 304 intended to make the e-mail appear to be a genuine e-mail from a corporation with which the user has an account. The text suggests that there has been account activity that the user must address and provides two links 330, 331. The user is instructed to open the links and the linked page may then ask the user to provide credentials or other information. This is a typical format for a phish attack.

In addition to the flags, the opened e-mail also includes a banner 340 as in FIGS. 2 and 3 with a general warning 342 about the risk level of the e-mail. As an example, the banner can include the flag from the mailbox view with a color and a text warning such as "warning" or "phish" in bright red to draw attention. The banner warning helps to remind the user to use caution when interacting with the e-mail. As shown above, the user may also be able to perform actions within the banner based on the insight provided by the banner. These actions can be each indicated with a corresponding button on the user interface, such as deleting, by selecting a delete button 344, disapproving by selecting a dislike button 346, approving by selecting a like button 348, requesting more information about why the e-mail is suspicious by selecting a question button 348 and reporting the e-mail by selecting a report button 350. The banner with the general warning and supporting general actions allows a user to quickly respond to a threatening e-mail. Alternatively, there may be a banner with no buttons for user action.

An information box 332 is displayed with the e-mail to indicate that the e-mail is suspicious and why. In this example, the information box states that the e-mail is a phish because it comes from "untrusted senders." Other reasons may be provided, depending on the implementation or there may be no reason provided. In other embodiment, the user makes a selection on the screen in order to see a reason or explanation. As shown, the e-mail is flagged as phish in FIG. 1 and flagged in more detail as untrusted senders in FIG. 4. The flag can be indicated in a color, such as red to show that the e-mail may be dangerous. The information box also provides further information in this case that the user has previously provided feedback that the sender is untrusted.

Figure 5:
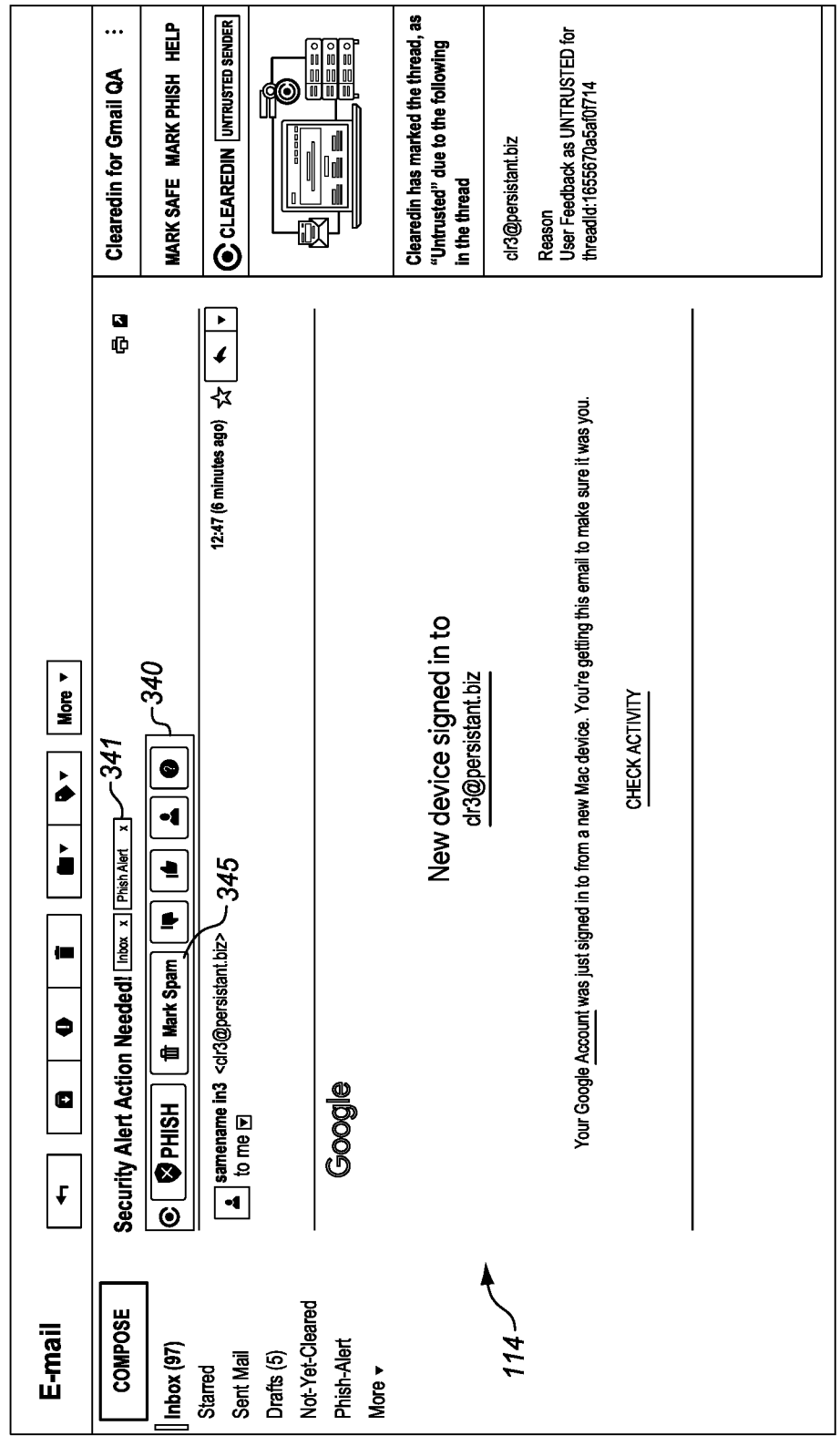
FIG. 5 is a diagram of the interface in the fourth configuration upon selection of the delete button according to embodiments.

FIG. 5 shows the same e-mail 114 as in FIG. 4 with the same banner 340. In this diagram the user has selected the delete button 344 and the button is changed to a new appearance 345 to indicate that the user has marked the e-mail as spam. This action will be received at the detection engine to confirm the flag from the detection engine that the e-mail is spam and should also be deleted. The detection window will keep a record of the e-mail for use in future detections. Other buttons in the banner may be configured in a similar way so that selecting the button changes the appearance or so that hovering over the button provides an explanation of the button before the user makes the selection. Selection and status of buttons can be indicated in other ways, depending on the implementation.

Figure 6:
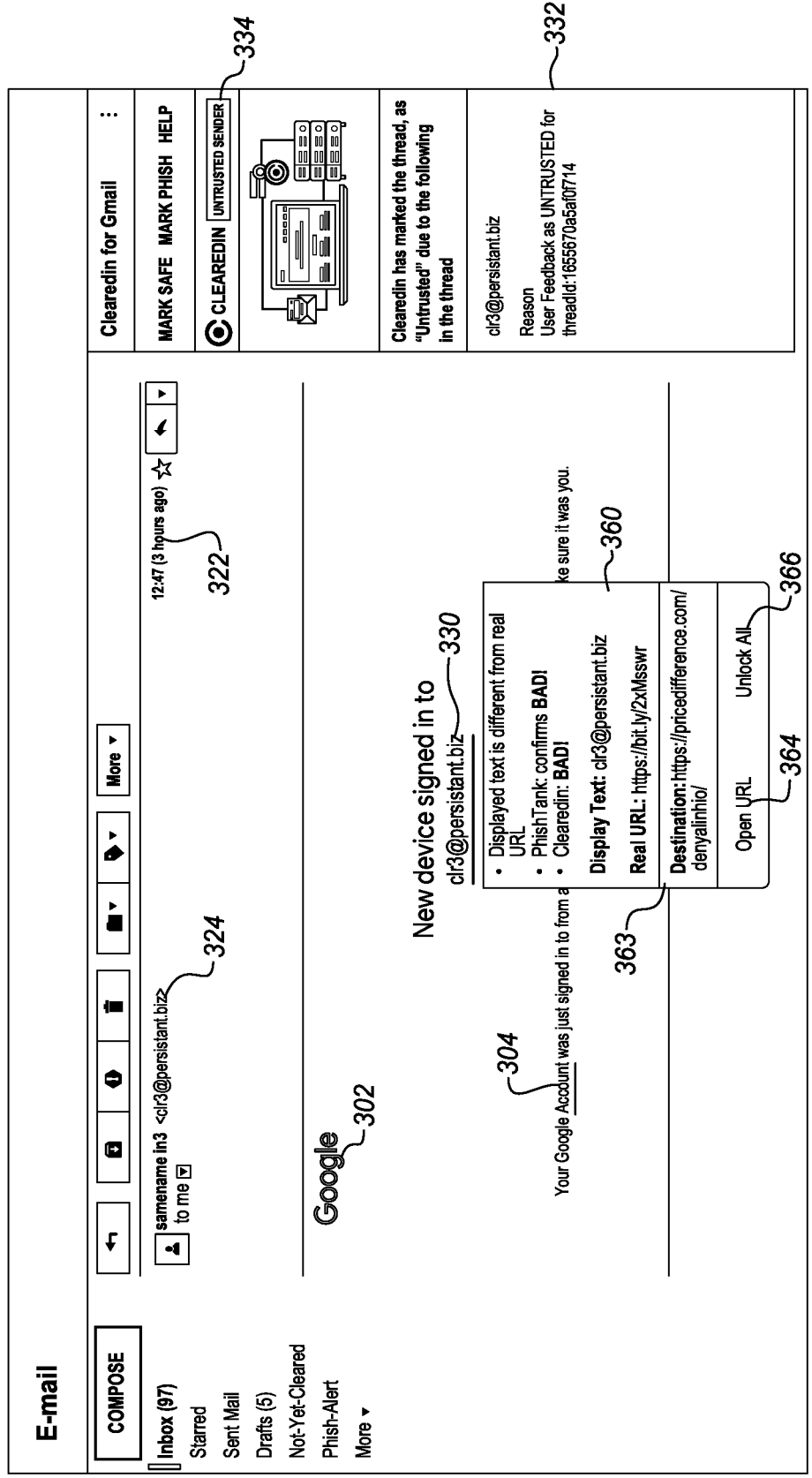
FIG. 6 is a diagram of the interface in the fourth configuration upon selection of a risk box according to embodiments.

FIG. 6 shows the same opened e-mail 114 after the user has opened a risk box 360. The diagram shows that the user has hovered over the first link 330. In this phish e-mail all functions are locked and disabled including this suspicious link 330. After hovering, the risk box 360 is displayed flagging the suspicious link. There are two suspicious elements in this e-mail, the sender and the first link. The second link 331 may also be a suspicious element and its characteristics may be displayed by commanding a risk box for that link. The link may be to download an application from an external site or to open a web page from an external site. In this case, the link is combined with images 302 or other types of seemingly trustworthy or benign content 304. Using the opened e-mail display, the user is able to review the e-mail to determine if it contains any useful or important content before selecting any suspicious links. The suspicious links are also clearly flagged so that the user may consider carefully before opening a suspicious link.

In this example, the user's action of hovering over or selecting the suspicious link has been used as a user command to display specific information about the suspicious link in the risk box. The risk box may be called or commanded in any of a variety of different ways. In this example, there is an explanation of what the link is and why it is suspicious. "Displayed text is different from real URL." The risk box also shows the destination from the real URL in a flagged area 363 of the risk box showing that the destination is not trusted. The user is allowed to avoid the link which is already disabled. There is also a button 364 to enable the link by selecting the button. If the link is enabled, then the user is allowed to select the link and perform the action suggested by the e-mail. If the link remains disabled, then the user cannot link to the included URL to open a page or download an element. The risk box also includes the "unlock all" button 366 as in previous examples. The particular displays and explanatory text are provided as examples and may be adapted to suit other users or other preferences.

In these examples, the user is invited to make trust and distrust decisions based on the user's review of the opened e-mail or even on seeing the e-mail metadata in the inbox. These decisions are indicated by selecting appropriate buttons in the interface. The selections generate data that can be collected by the detection system to enhance the accuracy of the detections.

Figure 7:
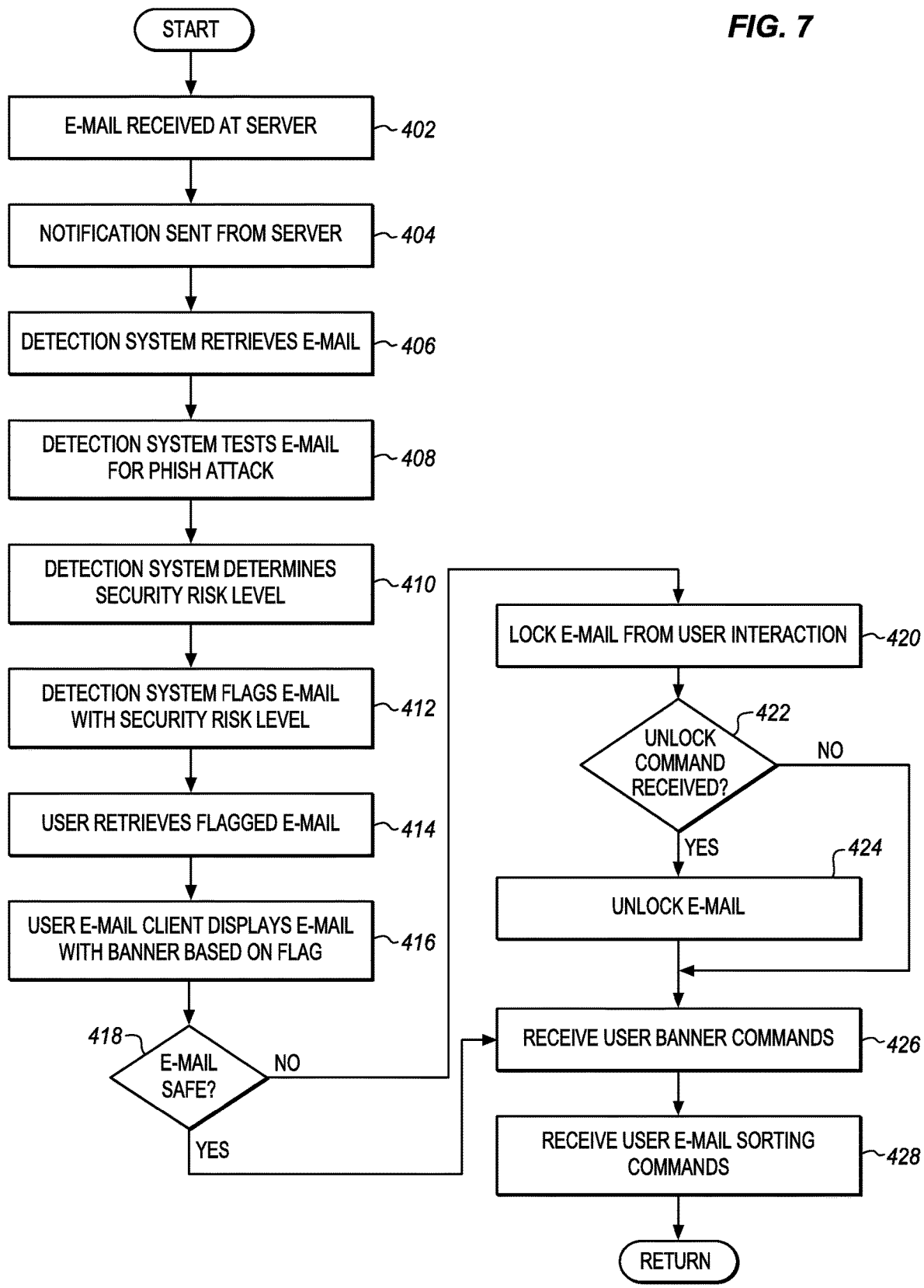
FIG. 7 is a process flow diagram of protecting users from attack according to embodiments.

FIG. 7 is a process flow diagram of protecting users from attack according to an embodiment. This process is configured to operate with a cloud service and a remote attack detection system but may be adapted to hosted e-mail and to a hosted detection system. At 402 an e-mail is received by an e-mail host or server. This is a conventional e-mail receipt and may be accompanied by any other conventional operations, depending on the e-mail configuration such as firewall operations, and receipt and confirmation operations. At 404 a notification is sent to all of the designated locations that the e-mail has arrived. This may be done using notification, alert, or subscription services that are provided by the e-mail service. In some embodiments a PubSub (Publication Subscription) API (Application Programming Interface) allows an e-mail user to designate locations, devices, or addresses that receive notifications. These may be through a push or pull process. The detection system is included among the designated locations. In other words, the detection system subscribes to the e-mail account and thereafter is notified when e-mails arrive.

At 406, the detection system retrieves the e-mail and at 408 tests the e-mail for a phish attack. Any of a variety of different tests may be used including those described above. The addresses in the metadata may be compared to a black list, a white list, a ranked list, a reputation list, or any other type of list, matrix or any other type of metadata analysis system. The content of the e-mail may be scanned or tested for executable code or program calls. The links in the e-mail may be tested against black links or redirections, etc. The detection system, based on these or other tests may then determine at 410 a threat or security risk level of the retrieved e-mail. As indicated above, there may be three levels green, yellow, and red or alert, not yet cleared, or phish. Any of a variety of other numbers of tiers and identifies and colors may be used for the various tiers of risk.

At 412 the detection system flags the e-mail at the server. In some embodiments this is done by labeling, starring, or categorizing, depending on the e-mail system. The e-mail is now associated with an appropriate security risk identification that will be presented with the e-mail when the user retrieves the e-mail. At 414 the user retrieves the flagged e-mail.

The e-mail will be displayed by the user's e-mail client with a banner and other features as shown in FIGS. 1-6 depending on how the e-mail has been flagged. In some embodiments, the e-mail client reads the flag and then modifies the e-mail to include the banner and other features. In other embodiments, the banner and other features are added at the e-mail server. The e-mail client will also check the flag to determine the security status of the e-mail at 418. The specific type of checking will depend on the tiers that are used for the security risk level. For the simple three-tier system shown in FIGS. 1-6, if the e-mail is rated as phish, then at 420, the e-mail client locks or disarms the e-mail using DOM or some other technology.

As shown in FIGS. 4-6, the links in the locked e-mail are disabled until the user sends a command at 422 to open the link notwithstanding the security warnings. Alternatively, the user can send a command to keep the e-mail locked. The user can also send unlock or lock commands using the banner 340. As an example, the user can mark an e-mail as spam 345 or mark the e-mail as safe notwithstanding the warning in the banner and the flag. If the user does not unlock the e-mail, then the process continues to display the e-mail and receive banner commands at 426 and sorting commands at 428. If the user commands the e-mail or any particular suspicious element to be unlocked at 422, then the e-mail or element is unlocked at 424.

The locking and unlocking can be performed by a plug-in, an API call or other functionality at the e-mail client. Information about the user command can be sent to the detection system by the e-mail client to the detection system whether that is a remote or hosted detection system. As mentioned above, in some embodiments the e-mail is replaced with an image of the e-mail. The image may be sent to or retrieved by the e-mail client from the detection system or from the e-mail server. In order to unlock the e-mail or an element of the e-mail, the image is replaced by the original e-mail including some or all of its functionality. The original e-mail may be retrieved from the e-mail server. With the original e-mail restored, the user is able to then interact with the e-mail and any content of the e-mail.

On the other hand, if the e-mail has been rated as safe or not yet rated then the process continues at 426 to receive user commands for the displayed e-mail. At any time in the process of displaying an e-mail in the e-mail client, the user may provide banner commands. These are received 426 at the e-mail client and may be further processed in any of a variety of different ways. In some embodiments, the banner commands are sent to the detection system to provide further information or to log like, dislike, or other commands. Other banner commands may be sent to a system administrator as described above. Since the banner is not a part of the e-mail but is added by the e-mail client or the e-mail server, the banner may function even when the e-mail is otherwise locked.

The user may also provide any conventional e-mail sorting commands, such as delete, reply, forward, move, mark, and similar commands. When the e-mail client receives these types of commands at 428, then these may be executed using conventional methodologies. Many of these commands rely on metadata of the e-mail and so these are disabled when the e-mail is locked but are made possible if the e-mail is not locked or is later unlocked.

Figure 8:
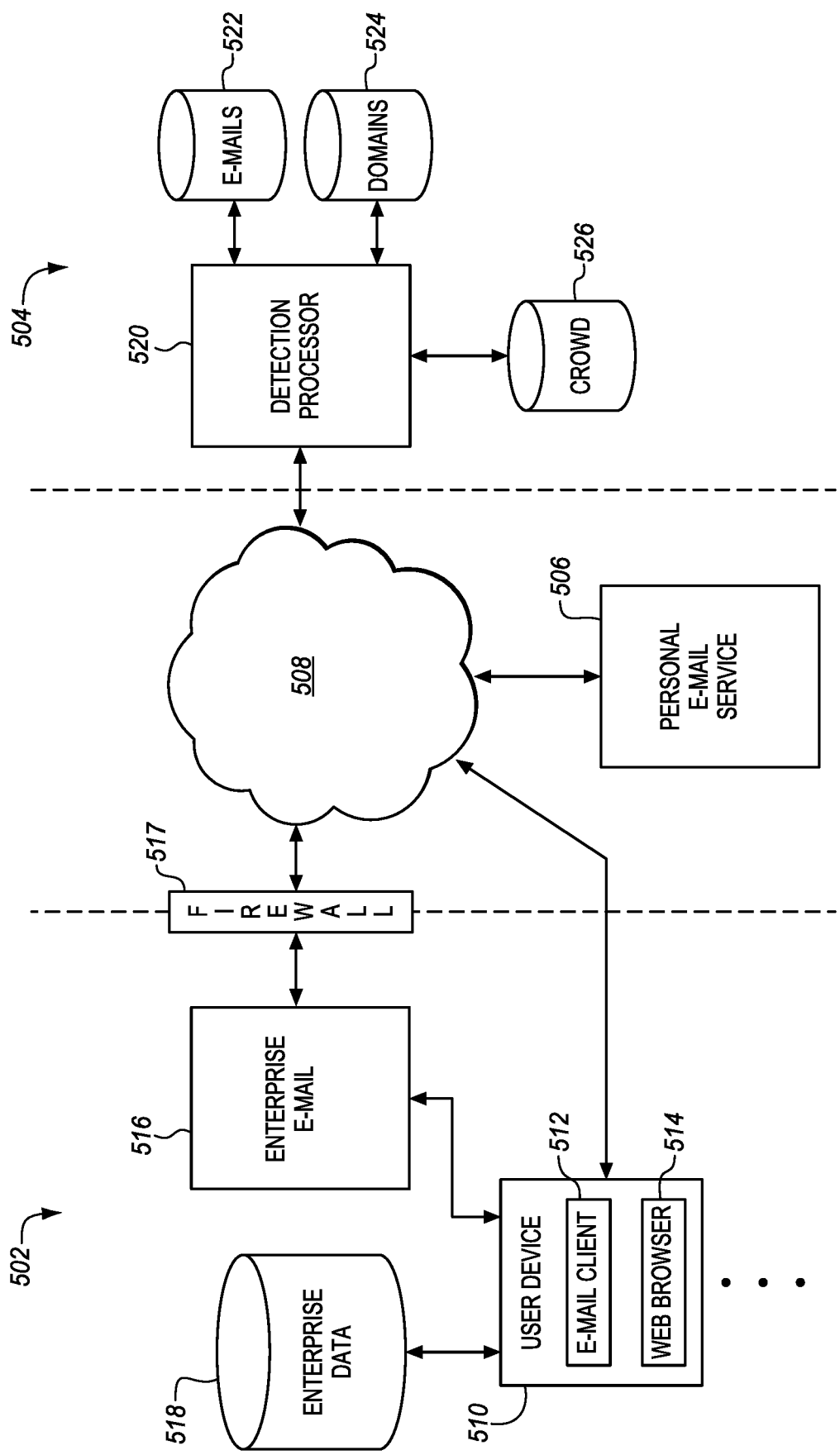
FIG. 8 is a diagram of a generalized configuration for e-mail services within an enterprise according to embodiments.

FIG. 8 is a diagram of a generalized configuration for e-mail services within an enterprise. An enterprise system 502 is protected by a firewall 517. The enterprise has an e-mail server 516 and various enterprise data resources 518 that may be exposed to external attack. A user has a user device 510 within the enterprise with an e-mail client 512 to receive e-mail service from the enterprise server. The user may also or alternatively have a web browser 514 to receive e-mail services from the Internet 508. The enterprise e-mail may also be through the web browser and the Internet e-mail may also be through an e-mail client. The enterprise may have many more functions, services, and facilities than shown, any of which may be the subject of an attack.

The user device 510 connects using the web browser through the Internet 508 to a personal e-mail service 506. In some implementations this connection this connection may be direct without the connection of the firewall, as shown. This is particularly common when the personal e-mail is through a cellular telephone subscription. Alternatively, all traffic may be through the firewall 517. This service provides personal e-mails and perhaps other types of personal services such as news feeds, messaging, social updates, friend posts, etc. In some cases, such a personal e-mail service is also used as the enterprise e-mail service in which case, there is no enterprise e-mail server 516. Such a system may also provide other services, such as document generation, accounting services and other business-directed services.

A detection system 504 is coupled through the Internet 508 to the user device 510. The connection may be direct through the browser using e.g. a plugin or it may be through the enterprise e-mail server 516 or in another way. Alternatively, the detection system may be within the enterprise and hosted by the enterprise. The detection system has a detection processor 520 with access to an e-mail database 522, a domain database 524 and crowd wisdom data 526. These are used by the detection processor to detect safe and phish e-mails.

The e-mail data 522 includes user actions to trust or not trust particular e-mails as well as threads and histories of communications. The domain database has information about various domains, such as white lists of trusted domains and black lists of unsafe domains, or any one or more other such structures. This data may be enhanced by any of a variety of trace, ping and other operations performed through the Internet to test domains and routes.

Figure 9:
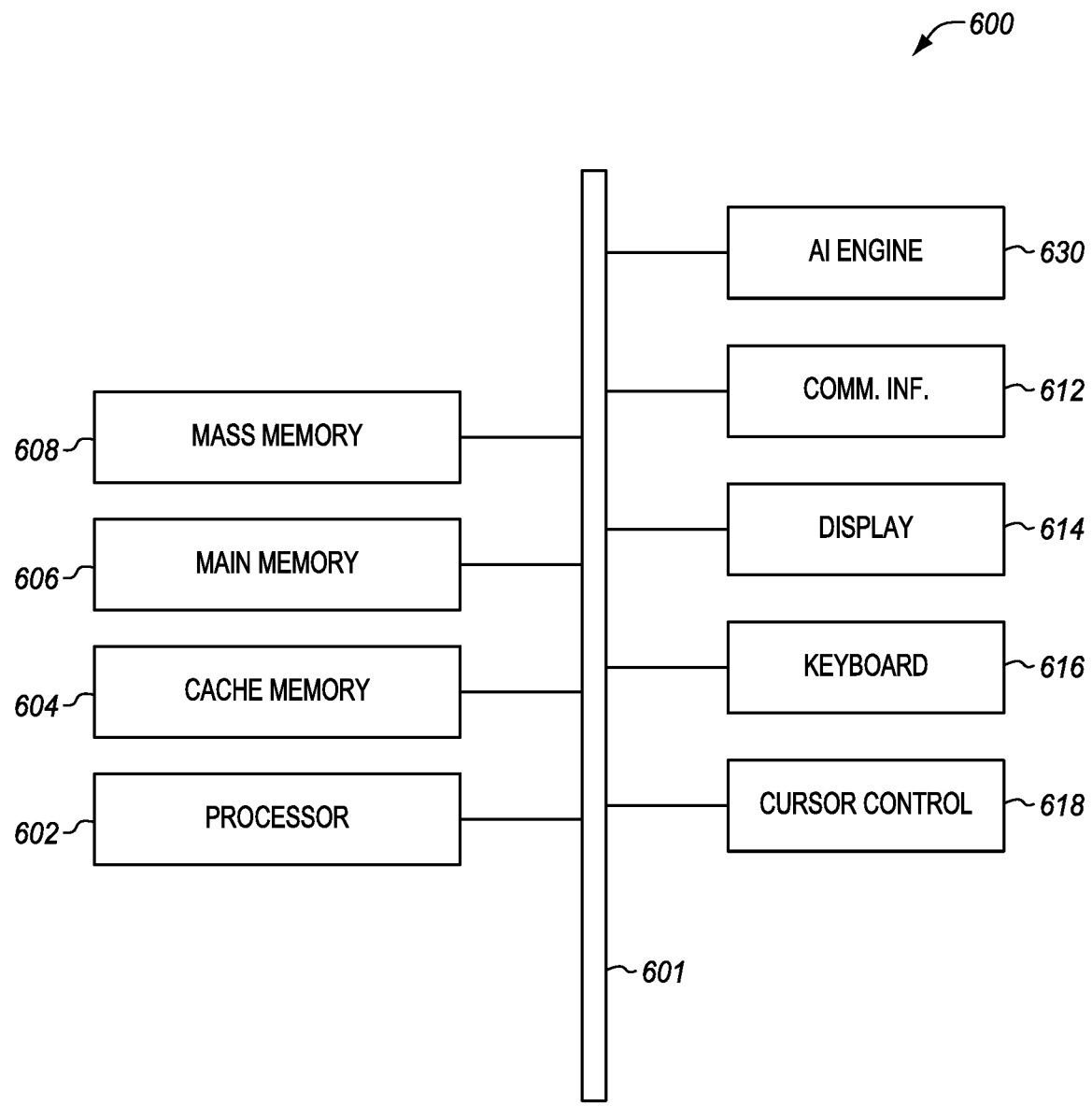
FIG. 9 is a block diagram of a computer system upon which embodiments may be implemented.

FIG. 9 is a block diagram of a computer system 600 representing an example of a system upon which features of the described embodiments may be implemented, such as the systems 506, 510, 516, 517, and 520 of FIG. 8. The computer system includes a bus or other communication means 601 for communicating information, and a processing means such as one or more microprocessors 602 coupled with the bus for processing information. The computer system further includes a cache memory 604, such as a random access memory (RAM) or other dynamic data storage device, coupled to the bus for storing information and instructions to be executed by the processor. The main memory also may be used for storing temporary variables or other intermediate information during execution of instructions by the processor. The computer system may also include a main nonvolatile memory 606, such as a read only memory (ROM) or other static data storage device coupled to the bus for storing static information and instructions for the processor.

A mass memory 608 such as a solid state disk, magnetic disk, disk array, or optical disc and its corresponding drive may also be coupled to the bus of the computer system for storing information and instructions. The computer system can also be coupled via the bus to a display device or monitor 614 for displaying information to a user. For example, graphical and textual indications of installation status, operations status and other information may be presented to the user on the display device. Typically, an alphanumeric input device 616, such as a keyboard with alphanumeric, function and other keys, may be coupled to the bus for communicating information and command selections to the processor. A cursor control input device 618, such as a mouse, a trackball, trackpad, or cursor direction keys can be coupled to the bus for communicating direction information and command selections to the processor and to control cursor movement on the display.

A communication device 612 is also coupled to the bus. The communication device may include a wired or wireless modem, a network interface card, or other well-known interface devices, such as those used for coupling to Ethernet, token ring, cellular telephony, Wi-Fi or other types of physical attachment for purposes of providing a communication link to support a local or wide area network (LAN or WAN), for example. In this manner, the computer system may also be coupled to a number of clients or servers via one or more conventional network infrastructures, including an Intranet or the Internet, for example.

The system of FIG. 6 further includes an AI (Artificial Intelligence) engine. This may be implemented in dedicated hardware using parallel processing or in the processor 602 or using some combination of resources. The AI engine may also be external to the server system 600 and connected through a network node or some other means. The AI engine may be configured to use historical data accumulated by the server system to build a model that includes weights and criteria to apply to the selection processes. The model may be repeatedly rebuilt using the accumulated data to refine and increase accuracy.

A lesser or more equipped computer system than the example described above may be preferred for certain implementations. Therefore, the configuration of the exemplary computer system will vary from implementation to implementation depending upon numerous factors, such as price constraints, performance requirements, technological improvements, or other circumstances. The computer system may be duplicated in different locations for distributed computing. As an example, the system may use a simple pre-programmed deterministic selection model instead of an AI model and the AI engine.

While the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the methods described herein may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present description includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The described operations may be provided as a computer program product that may include a machine-readable medium having stored instructions thereon, which may be used to program a computer (or other machine) to perform a process according to the present invention. The machine-readable medium may include, but is not limited to optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to selecting commands for recovery and remarketing, the method and apparatus described herein are equally applicable to other types of agents for other aspects of recovering physical assets. For example, the techniques described herein may be useful in connection with recovery of recreational vehicles, boats, planes and other movable assets used as collateral to secure a loan or lease.

Some embodiments described herein pertain to a non-transitory machine-readable medium comprising a plurality of instructions, executed on a computing device, to facilitate the computing device to perform one or more of any of the operations described in the various embodiments herein.

Some embodiments described herein pertain to receiving an e-mail, detecting a suspicious element in the e-mail, disabling the suspicious element of the e-mail, flagging the suspicious element of the e-mail, displaying the e-mail in an e-mail user interface with the disabled element and the flag, receiving a user command to enable the disabled element of the displayed e-mail, and enabling the disabled element. Further embodiments relate a machine-readable medium, to an apparatus, and to means for performing the described functions.

Although this disclosure describes some embodiments in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
receiving an e-mail at an e-mail client, the e-mail having an addressee, the e-mail client having an internet browser user interface that is operable by and accessible to the addressee;
receiving a detection of a suspicious element in the e-mail from a detection system;
disabling the suspicious element of the e-mail using a document object model of the internet browser to identify and lock the suspicious element in the internet browser using a browser extension;
flagging the suspicious element of the e-mail as suspicious using the document object model to identify and flag the element; and
displaying the e-mail in the e-mail internet browser user interface with the disabled suspicious element and the flag;
receiving a user command to enable the disabled suspicious element at the internet browser user interface;
enabling the disabled suspicious element at the internet browser user interface in response to the received user command.

2. The method of claim 1, wherein receiving comprises receiving the e-mail in the browser from an e-mail service and sending metadata of the e-mail to the detection system, wherein detecting comprises detecting at the detection system using the metadata, and wherein flagging comprises generating a flag at the e-mail client.

3. The method of claim 1, wherein receiving the e-mail comprises receiving a notification of the e-mail from an e-mail server and retrieving the e-mail from the e-mail server, the method further comprising flagging the e-mail at the e-mail server.

4. The method of claim 3, wherein flagging the e-mail comprises sending a labeling command to the remote server.

5. The method of claim 1, wherein receiving comprises receiving the e-mail at an enterprise e-mail server and wherein detecting comprises detecting at the enterprise e-mail server.

6. The method of claim 1, further comprising displaying the e-mail in an opened mail view with the suspicious element, an e-mail flag and a banner, the banner having buttons to receive a user command to accept or reject the e-mail and to receive further information about the e-mail.

7. A non-transitory machine-readable medium having instructions stored thereon that when executed cause the machine to perform operations comprising:
receiving an e-mail at an e-mail client, the e-mail having an addressee, the e-mail client having an internet browser user interface that is operable by and accessible to the addressee;
receiving a detection of a suspicious element in the e-mail from a detection system;
disabling the suspicious element of the e-mail using a document object model of the internet browser to identify and lock the suspicious element in the internet browser using a browser extension;
flagging the suspicious element of the e-mail as suspicious using the document object model to identify and flag the element;
displaying the e-mail in the e-mail internet browser user interface with the disabled suspicious element and the flag;
receiving a user command to enable the disabled suspicious element at the internet browser user interface;
enabling the disabled suspicious element at the internet browser user interface in response to the received user command.

8. The medium of claim 7 wherein receiving the e-mail comprises receiving a notification of the e-mail from an e-mail server and retrieving the e-mail from the e-mail server, the method further comprising flagging the e-mail at the e-mail server.

9. The medium of claim 8, wherein flagging the e-mail comprises sending a labeling command to the e-mail server.

10. An apparatus comprising:
a communications interface to receive an e-mail from an e-mail server and to receive a detection of a suspicious element in the e-mail from a detection system, the e-mail having an addressee;
a processor to disable the suspicious element by identifying and locking the suspicious element of the e-mail using a document object model of an internet browser using a browser extension, to flag the suspicious element of the e-mail as suspicious using the document object model and to flag the e-mail as suspicious in response to receiving the detection; and
a user interface using the internet browser operable by and accessible to the addressee as the user to display the e-mail in a mailbox view of the user interface, to display the e-mail in an e-mail view of the user interface with the disabled suspicious element and the flag, and to receive a user command to enable the disabled suspicious element and
wherein the processor is further to enable the disabled suspicious element in response to the received user command.

11. The apparatus of claim 10, wherein the processor is further to generate actionable insights for display on the user interface, the insights including an explanation of a suspicious characteristic of the suspicious element and the insight being actionable in that it includes an interface element for the user to enable the suspicious element.

12. The method of claim 1, further comprising:
flagging the e-mail as suspicious with a first warning level in response to receiving the detection;
displaying the e-mail flag in a mailbox view of the e-mail client without opening the e-mail for display to the user, the suspicious element not being selectable in the mailbox view;
flagging a second e-mail with a second e-mail flag with a second warning level; and
sorting the e-mail with other e-mails of the mailbox view based on the e-mail flag warning levels in the mailbox view.

13. The method of claim 12, wherein displaying the flag comprises identifying the first warning level with a distinctive color and an explanatory text in the mailbox view.

14. The method of claim 1, further comprising moving the e-mail to a specific location of the mailbox view based on the e-mail flag.

15. The method of claim 1, wherein the e-mail flag comprises a flag label, wherein the mailbox view has a list of labels including the flag label and wherein the e-mail is accessible in a view of the flag label.

16. The apparatus of claim 10, wherein the processor is further to flag the e-mail with a first warning level and to flag a second e-mail with a second warning level and wherein the user interface is further to sort in the mailbox view based on the flag warning levels.

17. The apparatus of claim 16, wherein the user interface is further to display the first warning level with explanatory text in the mailbox view.

18. The apparatus of claim 10, wherein the user interface is further to display the e-mail flag in the mailbox view of the user interface without opening the e-mail for display to the user, the suspicious element not being selectable in the mailbox view, and to sort the e-mail with other e-mails of the mailbox view based on the flag.

19. The apparatus of claim 10, wherein locking the suspicious element comprises displaying an image of the suspicious element.

20. The apparatus of claim 10, the user interface is further to:
   display a banner with the e-mail, the banner indicating that the e-mail is suspicious; and
   display the banner also in the mailbox view of the e-mail, wherein the banner further includes buttons to receive a user command to accept or reject the e-mail and to receive further information about the e-mail.

* * * * *